United States Patent [19]
Witt

[11] 3,866,472
[45] Feb. 18, 1975

[54] PROBE ASSEMBLY
[75] Inventor: Allan E. Witt, Westport, Conn.
[73] Assignee: Food Automation Service Techniques, Inc., Stratford, Conn.
[22] Filed: June 15, 1973
[21] Appl. No.: 370,413

[52] U.S. Cl. ................ 73/362 AR, 99/342, 338/28
[51] Int. Cl. ............................................ G01k 1/14
[58] Field of Search .......... 73/352, 362 AR; 99/330, 99/342, 408, 421 TP; 338/28

[56] References Cited
UNITED STATES PATENTS

| | | | |
|---|---|---|---|
| 2,838,935 | 6/1958 | DeCecio | 73/362 AR X |
| 2,938,385 | 5/1960 | Mack et al. | 73/362 AR |
| 3,213,778 | 10/1965 | Martino | 99/342 X |
| 3,241,370 | 3/1966 | Mertler | 73/352 |
| 3,326,692 | 6/1967 | Martino et al. | 99/330 UX |
| 3,678,751 | 7/1972 | Mead et al. | 73/362 AR |
| 3,815,113 | 6/1974 | Welch | 73/352 X |

*Primary Examiner*—Richard C. Queisser
*Assistant Examiner*—Frederick Shoon
*Attorney, Agent, or Firm*—Haynes N. Johnson

[57] ABSTRACT

A probe assembly for use in deep fat frying of French fries, fish, chicken and the like, wherein the length of cooking time is calculated by a timing computer responsive to the temperature of a predetermined portion of the cooking medium. The probe is formed as a deformable closed-end sheath adapted to be bent to a predetermined shape to conform to the configuration of a fryer and to retain said shape for repeatably repositioning the probe in the same portion of the cooking medium. The sheath is formed of a smooth oil impervious metal and positions a temperature sensing element, such as a thermistor, in a resilient embedding compound inside the sheath adjacent its closed end. Flexible temperature resistant electrical leads within the sheath extend from the temperature sensing element through a high temperature resistant portion of the sheath to the opposite end of the sheath where a fastener means such as a socket, is mounted for fixedly but removably securing said sheath to the timing computer and for electrically interconnecting the electrical leads with the computer. The probe construction solves installation and cleaning problems and enables the closed end of the sheath, containing the temperature sensitive element, to be repeatably fixed in said predetermined portion of the cooking medium, thereby supplying uniform temperature data input to the computer.

6 Claims, 5 Drawing Figures

PATENTED FEB 18 1975　　3,866,472
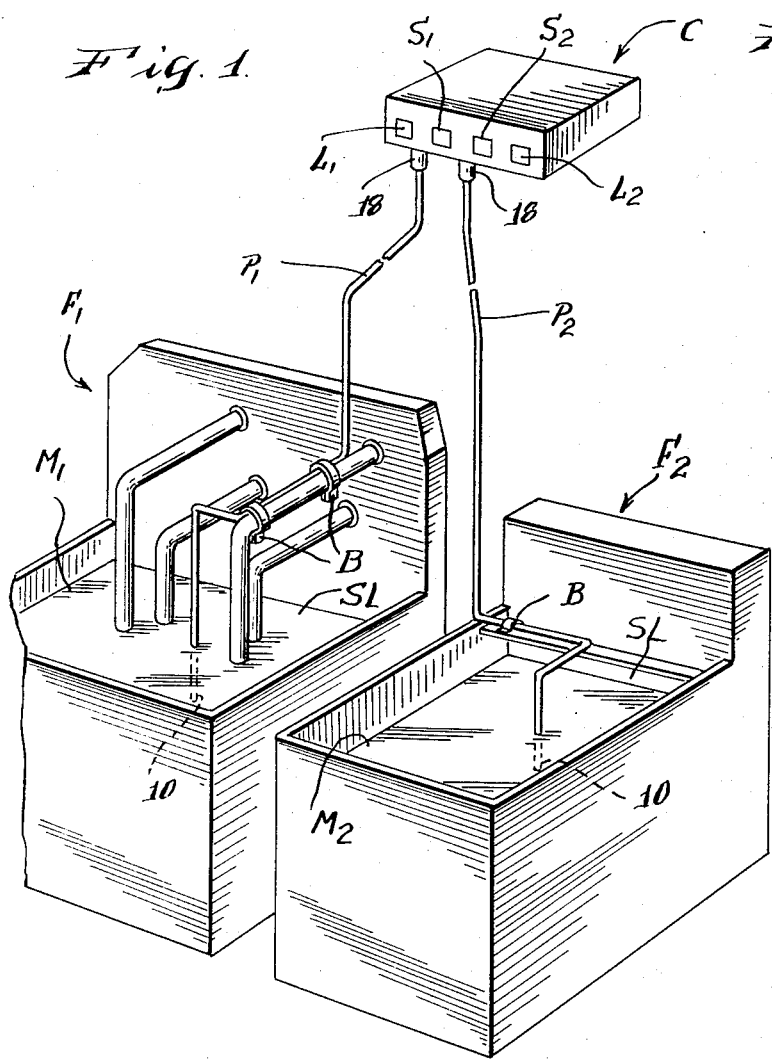
Fig. 1.
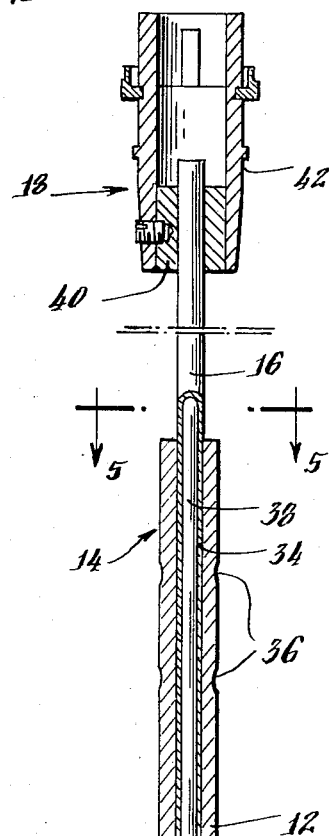
Fig. 2.
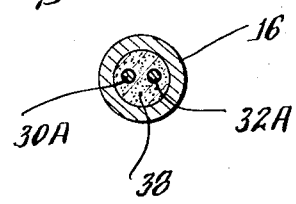
Fig. 5.
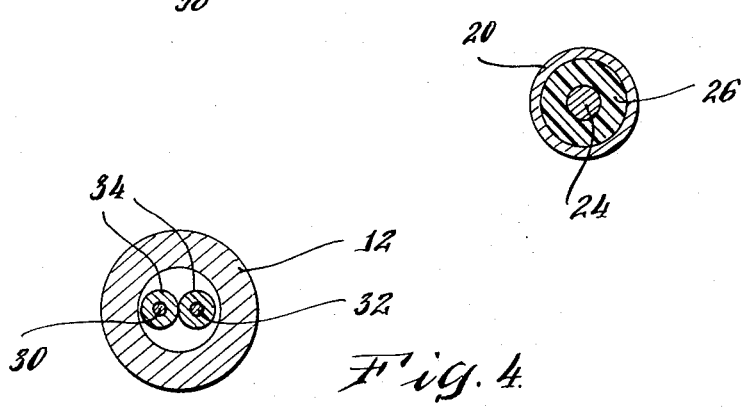
Fig. 3.
Fig. 4.

PROBE ASSEMBLY

BACKGROUND OF THE INVENTION

1. Field of the Invention

The field of the present invention relates to temperature sensing probes used in a deep fat frying environment, the probe being submerged in a predetermined location in a bath of the cooking medium and supplying temperature data as an input to a cooking timing computer which calculates the appropriate length of cooking cycle based on the temperature, and variations in temperature, of that particular location in the cooking medium.

2. Description of the Prior Art

Probes for use in a deep fat frying environment and designed to supply a temperature data input to a timing computer face many competing and conflicting design criteria. On the one hand, the probes should have a common configuration so they can be mass produced, while on the other hand they must be compatible with a multitude of different fryers. Similarly, the probes must be easily removable for cleaning, yet have their temperature sensing elements always return to the same location in the cooking medium to repeatably provide the correct temperature data input to the computer. The probe leads must be capable of withstanding very high temperatures since they may contact flames and open flues, yet the leads must be flexible for easy connection to the computer and to permit the probe to be moved. Yet while the probe must be flexible, it must at the same time, for sanitary reasons, be provided with an easily cleaned surface that does not entrap grease and bacteria. The probe must be mechanically and thermally rugged so that it will have a long lifetime with very little unproductive down time for repair, yet the probe must still provide accurate and rapid temperature response and cannot be unduly expensive.

The various probe constructions known in the prior art have been unable to resolve a significant number of these competing considerations. One known probe construction, for example, mounts a temperature sensing element at the end of a rigid tube where the cooking medium can come into contact with it. While good temperature response is obtained, the probe is difficult to clean and has a short lifetime. The rigid tube is secured to the edge of the fryer with a clip, sacrificing the quality of data supplied to the computer because the temperature near the side of the fryer varies considerably from the temperature where the product is cooked. Other rigid probe structures are hung over the edge of the fryer with nothing to assist in relocating the probe for repeatable results. Other known probes provide flexibility in their leads by using braided stainless steel conduit, but this impairs cleanability of the probe and makes certification for sanitary use by national testing services difficult or impossible. Known probe constructions have not satisfactorily solved the problem of temperature resistance of leads, and most of the probes have a short lifetime and considerable lost usefulness due to repair and replacement.

SUMMARY OF THE INVENTION

Objects of the present invention are to provide an improved probe for supplying temperature data to a timing computer used in a deep fat frying environment, the probe providing accurate and repeatable temperature measurement to provide uniform temperature data input to the computer, the probe further being compatible with different fryer designs, mass producible, resistant to high temperatures, flexible, easily cleaned, mechanically and thermally rugged, and economical.

In a preferred embodiment of the invention, the probe for use in deep fat frying, wherein the length of cooking time is controlled by a timing computer responsive to the temperature of a predetermined location in the cooking medium, is formed with a deformable closed-end sheath adapted to be bent to a predetermined shape and to retain said shape, the sheath being formed of a smooth surfaced, oil impervious metal. A temperature sensing element is fixedly positioned within the sheath at its closed end, and flexible temperature resistant electrical leads within the sheath lead from the temperature sensing element to the other end of the sheath, where the leads connect to the computer and the sheath has means for fixedly but removably securing the sheath to the computer. When the sheath is bent into its retained predetermined shape, the closed end of the sheath is positioned in the predetermined location in the cooking medium, thereby providing uniform temperature data input to the computer. In other aspects of the invention the sheath comprises a sleeve having a thin walled portion at said closed end to fixedly receive the temperature sensing element in a resilient embedding compound, and the flexible leads are carried freely in said sleeve and have a length longer than that of the sleeve to accommodate bending thereof. Additionally, the sheath has the electrical leads between the sleeve and the computer securing means enclosed in a stainless steel shell containing a finely divided, highly temperature resistant insulator such as magnesium oxide.

Further objects, advantages and aspects of the invention will be pointed out in, or apparent from, the detailed description hereinbelow, considered together with the following drawings.

DESCRIPTION OF THE DRAWINGS

FIG. 1 is a perspective view, essentially schematic, showing deep fat fryers arranged to be governed by a timing computer utilizing probes in accordance with the present invention;

FIG. 2 is an axial section, with enlarged scale, of a probe constructed according to the present invention; and FIGS. 3, 4 and 5 are enlarged scale sections taken on lines 3—3, 4—4 and 5—5 of FIG. 2.

DESCRIPTION OF THE PREFERRED EMBODIMENT

Referring first to FIG. 1, two different types of typical deep fat fryers F1 and F2 are shown in a side by side installation serviced by a common cooking timing computer C having start buttons S1 and S2 for independently starting the timing of cooking cycles, and indicator lights L1 and L2 for indicating when the respective cycles are over. Cooking timing computer C is preferably of the well known type which continuously monitors the temperature of the cooking media M1 and M2 in the fryers F1 and F2 as the temperature varies during a cooking cycle, and mathematically processes the temperature input data so as to integrate the temperature with respect to time to calculate when the desired degree of doneness is obtained. Examples of such timing computers are shown in U.S. Patent application Ser.

No. 51,629, filed July 1, 1970, of Allan E. Witt and George M. Suhm.

As shown in FIG. 1, timing computer C monitors the temperature of cooking media M1 and M2 in fryers F1 and F2 by means of probes P1 and P2 constructed according to the present invention and attached with brackets B to the fryers. As will be explained below, the construction of such probes enables their lower ends 10 containing temperature sensing elements to be accurately and repeatably positioned a uniform distance beneath the surface level SL of the cooking media M1 and M2 and in a location midway between the sides of the tank, where the temperature of the cooking medium fluctuates along with the temperature of the cooking medium in contact with the product being cooked.

Referring now to FIGS. 2 through 5, each of probes P1 and P2 is constructed initially in straight (unbent) form as the illustrated probe P, comprising a tubular stainless steel sleeve 12 terminating in lower end 10 and connecting at its upper end 14 to a smaller diameter stainless steel tubular shell 16, which in turn is fastened to a connector socket 18 joining with computer C.

The lower sleeve 12 has a thin walled region 20 with a closed end 22 at the lower end 10 of the probe P. A temperature sensing element 24 is fixedly seated within thin walled portion 20 in a resilient embedding compound 26, such as the silicone rubber product manufactured by General Electric Company and known as Room Temperature Vulcanizing Silicone Sealer. Preferably the temperature sensing element 24 comprises two thermistors in glass beads, wired in series and calibrated to follow a prescribed curve with no more than 1 percent error in the temperature range of 150° to 450°F. The embedding compound 26 has sufficient resilience to protect the thermistor beads from physical shock, as well as from thermal shock caused by thermal expansion and contraction of the sleeve wall 20. Two electrical leads 30, 32 connected to temperature sensing element 24 are carried freely within sleeve 12. The leads 30, 32 are covered with a temperature resisting plastic coating 34, such as the product manufactured by DuPont under the name Teflon (polytetraflouroethylene). The electrical leads 30, 32 within sleeve 12 are provided with a length longer than sleeve 12, so that when sleeve 12 is bent into probes P1 or P2 to conform to the contours of a deep fat fryer such as F1 or F2, sufficient lengths of conductors 30, 32 will be available to accommodate the bends without strain.

Sleeve 12 and shell 16 are made from smooth surfaced stainless steel which is capable of being bent through a fairly small radius without cracking. In one typical example, sleeve 12 is made from a 20 inch length of 0.25 inch outside diameter, 0.125 inch inside diameter stainless steel tube, with thin walled portion 20 being machined therefrom to a 0.19 inch outside diameter and closed end 22 welded thereto, and shell 16 is made from a three to five foot length of 0.125 inch outside diameter stainless steel tube.

Upper shell 16 is fastened to sleeve 12 by inserting it within the sleeve with a sealing compound 34, such as epoxy, therebetween. Crimps 36 are made in the assembled structure to hold sleeve 12 in shell 16. Electrical leads 30, 32 in sleeve 12 are joined respectively with electrical leads 30A, 32A in shell 16. The conductors are typically joined by welding to provide a joint capable of withstanding high temperatures.

Conductors 30A, 32A within shell 16 are uncoated, and are embedded in a finely divided temperature resistant substance 36 such as a magnesium oxide powder or diatomaceous earth. Accordingly, shell 16 with conductors 30A, 32A contained therein, is at once flexible, highly temperature resistant, and smooth surfaced to facilitate cleaning. This portion of probe P, constructed as described above, is capable of withstanding temperatures on the order of 1,500°F and thus even if this portion of the probe comes in contact with flame or is passed through an open flue, no damage to the probe will result. A suitable example of a product furnishing shell 16, conductors 30A, 32A, and substance 36 is the product manufactured under the name "Thermocoax" by Amperex Electric Corporation of Hicksville, Long Island, N.Y.

At its upper end shell 16 is fastened to connector socket 18 by silver soldering it to connector sleeve 40 to which the body 42 of connector 18 is attached. Suitable electrical connections (not shown) are made to leads 30A, 32A.

Probe P is assembled with sleeve 12 unbent. Leads 30A and 32A are preassembled in shell 16 and connected to leads 30 and 32 and connector socket 18. The temperature sensing element 24 is dipped in the embedding compound 26 and is inserted within sleeve 12. Shell 16 is directly inserted into sleeve 12 after having sealing compound 34 applied thereto. Crimps 36 are then supplied.

Sleeve 12 of probe P then is deformed in a configuration matching the particular fryer, such as F1 or F2, on which it is to be used. Such bending may be done at the factory for standard model fryers. In the field, the bent probes P1 and P2 are attached with brackets B to the fryers F1 and F2, and the portion of the probes comprising shell 16 may be flexibly led, through high temperature regions or open flues if necessary, to wherever computer C is mounted, connectors 18 mating with complementary connectors on the computer C.

When the probes P1 and P2 are removed for cleaning, it is readily seen that because they are bent to conform to a particular fryer F1 and F2, they will be returned to exactly the same location in the fryer to provide accurate data input to computer C.

Thus, as described above, a probe has been provided which is simply constructed, and capable of mass production but which also is compatible with different fryer configurations. The probe is sensitive to temperature variations at its lower end 10, and yet has a portion encased within shell 16 which is highly temperature resistant and flexible. Sleeve 12 can be bent into many configurations without damaging or stretching electrical leads 30, 32. The entire probe is in the form of a closed-end sheath which has a smooth surface which is oil and grease impervious, which is easily cleaned, and which is incapable of harboring bacteria and the like. These advantages are achieved in a probe whose construction is neither unduly expensive nor complicated.

Although a specific embodiment of the invention has been disclosed herein in detail, it is to be understood that this is for the purpose of illustrating the invention, and should not be construed as necessarily limiting the scope of the invention, since it is apparent that many changes can be made to the disclosed structures by those skilled in the art to suit particular applications.

I claim:

1. A probe assembly for use in a deep fat fryer wherein the length of cooking time is to be calculated by a timing computer responsive to the temperature in a predetermined location in the cooking medium, said probe assembly including a first portion arranged to be attached to the fryer and to be partly immersed in the cooking medium, comprising a deformable closed end sleeve adapted to be bent to a predetermined shape to conform to the contours of the fryer and to thereafter retain said shape, said sleeve being formed of a smooth-surfaced metal impervious to said cooking medium, a temperature sensing element fixedly positioned within said sleeve at said closed end, flexible temperature-resistant leads within said sleeve leading from said temperature sensing element to the opposite end of said sleeve, and means for removably attaching said sleeve to the fryer, and a second portion arranged to be attached to the timing computer and being flexible and heat-resistant, comprising a flexible shell sealingly connected to said opposite end of the sleeve, said shell being formed of a smooth-surfaced metal impervious to said cooking medium, flexible temperature resistant leads within said shell joining with the leads in said sleeve, and means at the end of said second portion for fixedly but removably securing said second portion to said timing computer and for interconnecting said electrical leads with said computer, whereby the location of the fixed end of said sleeve may be accurately and repeatedly positioned in said predetermined location in said cooking medium, thereby providing a uniform temperature data input to said computer despite repeated removal of said sleeve from the fryer for cleaning.

2. A probe assembly for use in a deep fat fryer as claimed in claim 1 wherein said electrical leads within said sleeve have an insulating coating, are freely carried within the sleeve and have a length greater than the length of said sleeve to accommodate bending of the sleeve without imposing strain upon the leads.

3. A probe assembly for use in a deep fat fryer as claimed in claim 2 wherein said temperature sensing element is fixedly positioned within said sleeve at said closed end in a resilient embedding compound.

4. A probe assembly for use in a deep fat fryer as claimed in claim 1 wherein at said closed end said sleeve has a portion of reduced wall thickness in which said temperature sensing element is mounted.

5. A probe assembly for use in a deep fat fryer as claimed in claim 1 wherein said electrical leads carried within said flexible shell are bare and are surrounded therein with a finely divided temperature resistant insulating material.

6. A probe assembly for use in a deep fat fryer as claimed in claim 1 wherein said sleeve portion is bent to conform to the contours of the deep fat fryer.

* * * * *